(12) United States Patent
Hennemann

(10) Patent No.: US 9,243,728 B2
(45) Date of Patent: Jan. 26, 2016

(54) PIPE WITH REINFORCED FEMALE END

(75) Inventor: Thomas L. Hennemann, Cottage Grove, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 301 days.

(21) Appl. No.: 12/650,755

(22) Filed: Dec. 31, 2009

(65) Prior Publication Data

US 2011/0156384 A1    Jun. 30, 2011

(51) Int. Cl.
*F16L 15/08* (2006.01)
*F16L 47/16* (2006.01)

(52) U.S. Cl.
CPC .............. *F16L 15/08* (2013.01); *F16L 47/16* (2013.01); *Y10T 29/4998* (2015.01)

(58) Field of Classification Search
CPC ................................ F16L 47/16; F16L 15/08
USPC ............. 285/333, 334, 355, 390, 329; 29/446
See application file for complete search history.

(56) References Cited

U.S. PATENT DOCUMENTS

| | | | |
|---|---|---|---|
| 1,671,458 A * | 5/1928 | Wilson | 403/343 |
| 2,107,716 A | 2/1938 | Singleton | |
| 2,258,066 A | 10/1941 | Oyen | |
| 2,289,271 A | 7/1942 | Kane et al. | |
| 2,366,067 A | 12/1944 | Elijah | |
| 2,574,081 A | 11/1951 | Abegg | |
| 2,741,498 A * | 4/1956 | Elliott | 285/148.11 |
| 3,336,054 A | 8/1967 | Blount et al. | |
| 3,360,826 A | 1/1968 | Lorang | |
| 3,495,301 A | 2/1970 | Larsen et al. | |
| 3,508,771 A | 4/1970 | Duret | |
| 3,802,908 A | 4/1974 | Emmons | |
| 3,854,759 A * | 12/1974 | Cornelius | 285/251 |
| 3,856,906 A | 12/1974 | Edgar | |
| 3,910,744 A | 10/1975 | Ronden et al. | |
| 3,923,433 A | 12/1975 | Hermes et al. | |

(Continued)

FOREIGN PATENT DOCUMENTS

GB        2100818        1/1983
WO    WO 2007/138159 A1 *  12/2007  .............. F16L 47/06

OTHER PUBLICATIONS

Transcript of May 12, 2004 deposition of CertainTeed witness John Stott.

(Continued)

*Primary Examiner* — David E. Bochna
*Assistant Examiner* — James Linford
(74) *Attorney, Agent, or Firm* — Moore & Van Allen PLLC (57) ABSTRACT

A single piece of pipe connectable to a similar adjacent pipe and including a female end that is reinforced with a band. The pipe includes in one embodiment a male end having external threads, a female end having an enlarged exterior diameter, a first section at the female end having an interior diameter to receive a male end of the similar adjacent pipe, a second section at the female end having internal threads to mate with the external threads of the male end of the similar adjacent pipe. The first section is positioned to funnel the male end of the similar adjacent pipe to the second section, and the second section is positioned between an intermediate section and the first section. At least one reinforcement band is positioned circumferentially around at least a portion of the female end. The pipe is disconnectable from the similar adjacent pipe and reusable.

32 Claims, 7 Drawing Sheets

(56) References Cited

U.S. PATENT DOCUMENTS

| | | | | |
|---|---|---|---|---|
| 4,018,462 | A | * | 4/1977 | Saka ............................. 285/111 |
| 4,059,293 | A | * | 11/1977 | Sipler ........................... 285/236 |
| 4,059,379 | A | | 11/1977 | Korff et al. |
| 4,083,918 | A | | 4/1978 | Ronden et al. |
| 4,134,949 | A | | 1/1979 | McGregor |
| 4,154,466 | A | | 5/1979 | Simmons et al. |
| 4,266,813 | A | | 5/1981 | Oliver |
| 4,276,010 | A | | 6/1981 | Shartzer |
| 4,373,754 | A | | 2/1983 | Bollfrass et al. |
| 4,426,105 | A | | 1/1984 | Plaquin et al. |
| 4,445,265 | A | * | 5/1984 | Olson et al. ..................... 29/447 |
| 4,501,443 | A | | 2/1985 | Haring |
| 4,570,982 | A | | 2/1986 | Blose et al. |
| 4,591,195 | A | | 5/1986 | Chelette et al. |
| 4,796,928 | A | | 1/1989 | Carlin et al. |
| 4,889,620 | A | * | 12/1989 | Schmit et al. ................. 210/137 |
| 4,893,658 | A | | 1/1990 | Kimura et al. |
| 5,015,014 | A | | 5/1991 | Sweeney |
| 5,018,555 | A | | 5/1991 | Hawerkamp |
| 5,078,430 | A | | 1/1992 | St. Onge |
| 5,106,130 | A | | 4/1992 | Ellsworth et al. |
| 5,152,557 | A | * | 10/1992 | Dierickx ....................... 285/369 |
| 5,251,942 | A | | 10/1993 | Whaley |
| 5,277,456 | A | * | 1/1994 | Mer et al. ..................... 285/21.2 |
| 5,360,239 | A | | 11/1994 | Klementich |
| 5,360,240 | A | | 11/1994 | Mott |
| 5,398,975 | A | | 3/1995 | Simmons |
| 5,398,981 | A | * | 3/1995 | Barton ........................... 285/382 |
| 5,406,983 | A | | 4/1995 | Chambers |
| 5,437,481 | A | * | 8/1995 | Spears et al. ............. 285/148.13 |
| 5,582,439 | A | * | 12/1996 | Spears ........................... 285/333 |
| 5,622,670 | A | | 4/1997 | Rowley |
| 5,738,388 | A | | 4/1998 | Sundelin |
| 5,826,921 | A | | 10/1998 | Woolley |
| 5,827,467 | A | | 10/1998 | Ruppert |
| 5,967,568 | A | | 10/1999 | Bird |
| 6,209,926 | B1 | | 4/2001 | Mastro |
| 6,660,199 | B2 | | 12/2003 | Siferd et al. |
| 6,666,480 | B2 | | 12/2003 | Haney et al. |
| 6,928,669 | B2 | * | 8/2005 | Akin ............................. 4/252.2 |
| 7,017,951 | B2 | * | 3/2006 | Spears ........................... 285/390 |
| 7,261,326 | B2 | | 8/2007 | Haney et al. |
| 7,425,024 | B2 | | 9/2008 | Haney et al. |
| 7,470,383 | B2 | | 12/2008 | Haney et al. |

OTHER PUBLICATIONS

Mid-Continent, "PVC Water Well Casings and Screens" brochure, pp. MP00014-MP00017, published Apr. 1975, place of publication—unknown.

Eastern District of Pennsylvania, Order construing term "predetermined interior diameter" of U.S. Pat. No. 6,666,480, (Doc. No. 116), p. 1, Oct. 24, 2005, Civil Action No. 03-CV-2131, published on PACER (www.pacer.gov).

Eastern District of Pennsylvania, "Memorandum of Plaintiff Certainteed Corporation in Support of Motion for Summary Judgment of Invalidity of the Patent in Suit," (Doc. No. 92), pp. 4-7, 9-12, Sep. 19, 2005, Civil Action No. 03-CV-2131, published on PACER (www.pacer.gov).

Marcel Decker, Inc., Thomas Sixsmith, "Handbook of Thermoplastic Piping System Design," pp. 137-141, 1997, ISBN No. 0-8247-9846-5.

CertainTeed Corporation, "Kwik-Set® Threaded Drop Pipe" brochure, p. 1, 2004, place of publication—unknown.

Eastern District of Pennsylvania, "Memorandum and Order" construing certain claim terms of U.S. Pat. No. 6,666,480, (Doc. No. 75), pp. 1-19, May 2, 2005, Civil Action No. 03-CV-2131, published on PACER (www.pacer.gov).

Transcript of Nov. 18, 2004 deposition of Northern Products witness Victor Weigel, pp. 40-41, 85-91, Civil Action No. A3-04-18 in the North Dakota District Court, Southeastern Division.

Canadian Patent Office, Office Action dated Jan. 15, 2013 for Canadian Application No, 2,722,644, pp. 1-2.

Canadian Patent Office, Office Action dated Nov. 18, 2013 for Canadian Application No. 2,722,644, pp. 1-4.

U.S. Patent and Trademark Office, U.S. Appl. No. 13/710,101, Non-Final Office Action dated Nov. 19, 2014, 8 pages.

* cited by examiner

PIPE WITH REINFORCED FEMALE END

BACKGROUND OF THE INVENTION

1. Field of the Invention

The present invention relates generally to threaded, submersible pump drop pipe and casing assembly connection and method of manufacture for use in water well and related systems.

2. Description of the Related Art

Piping systems with threaded connections are well known in the art. Threaded connections connect lengths of pipe using internal threads on the female end of a pipe that interlock with external threads on the male end of a similar adjacent pipe.

During manufacturing of the pipe, external threads are machined into the male end of the pipe and internal threads are machined into the female end of the pipe, typically through automated cutting processes. The shape of the threads, or "thread profile," can vary greatly and often depends on the particular application of the pipe. For example, triangular threads, square threads, rounded threads, and even trapezoidal threads are well known in the art.

Another thread characteristic that depends on the application of the pipe is whether the threads are machined on a pitch as the threads extend away from the leading edge of the pipe. Threads cut on a pitch, called "tapered threads," create a pipe with a gradually changing circumference as the threads extend away from the leading edge of the pipe. As such, for example, the outer circumference of a male end of a pipe with tapered threads increases as the threads extend away from the male leading edge of the pipe, causing the male end of the pipe to be generally shaped as a truncated cone.

Pipes with tapered threads are well known in the art and offer certain advantages over pipes with non-tapered threads (i.e., threads not cut on a pitch). For example, specific types of tapered threads such as NPTF threads (also known as Dryseal threads) are used in many piping applications to create watertight (or fluid tight) connections without requiring a sealing compound. The watertight connection is formed through a mechanical seal when the internal threads of the female end of a pipe deform into the external threads of the male end of an adjacent pipe (and vice versa) during tightening of the threaded connection.

Tapered threads also have a disadvantage in that care must be taken not to apply too much torque so as to overtighten the connection. Threaded connections with tapered threads are considered "hand-tight" (also known as "finger-tight") at the point when the male end of the pipe can no longer thread into the female end of an adjacent pipe by hand because the taper on the threads has caused the male end to become jammed within the female end. From hand-tight, a wrench is used to turn at least one of the connected pipes, making the connection "wrench-tight." Wrench-tight is generally accepted as being a maximum of two turns past hand-tight.

If one is not careful the threaded connection can be overtightened past wrench-tight and threaten the integrity of the connection. Overtightening the connection causes hoop stress on the female end of the pipe which, when large enough, will split the female end and cause a failed connection. Hoop stress is a problem with tapered threads that is well known in the art and often occurs near the last internal threads—i.e., the internal threads furthest away from the female leading edge of the pipe—although the failure can occur elsewhere on the female end.

Another problem for threaded connections is lateral stress failure of the connection due to lateral forces on the pipe and/or the connection. Although pipes with tapered threads are susceptible to lateral stress failure, this type of failure most frequently occurs on pipes with non-tapered internal threads (i.e., threads that are not cut on a pitch) within the female end of the pipe. Lateral stress failure usually occurs because the manufacturing process for forming the internal threads weakens the pipe wall. Non-tapered internal threads, as well as tapered internal treads, are typically formed in the interior wall of the pipe at the female end by cutting out a portion of the pipe wall. Removing material from the pipe wall decreases the wall thickness and makes the female end of the pipe more prone to lateral stress failure.

Lateral stress failure often occurs near the first internal threads—i.e., where the internal threads begin, near the female leading edge of the pipe—but can also occur elsewhere on the female end. In addition, the amount of threads cut into the female end of a pipe can increase its susceptibility to failure from lateral forces and pipes with more threads have a greater tendency to fail. As a result, a need also exists for strengthening pipes that use threaded connections to increase their resistance against lateral stress failure.

BRIEF SUMMARY OF THE INVENTION

The present invention is directed to a pipe with a reinforced female end to protect against failure of a threaded connection due to hoop stress and/or lateral stress.

The pipe of the present invention has a female end for receiving a male end of a similar adjacent pipe. At least a portion of the pipe at the female end has a reinforcement band that extends circumferentially around the pipe. The reinforcement band is preferably in the form of a cylinder that extends completely around the circumference of the pipe, although other embodiments with the reinforcement band extending only partially around the circumference of the pipe are contemplated by the present invention. Regardless, the reinforcement band is made from a rigid material or materials that are stronger than the material or materials from which the pipe is made. More specifically, the reinforcement band should have material characteristics which withstand higher hoop stresses and/or lateral stresses than the pipe material.

The present invention is also directed to a manufacturing processes to form the pipe of the present invention. The claimed manufacturing process is for extruded thermoplastic pipe, such as polyvinyl chloride (PVC) pipe or polyethylene pipe, which is belled with a mandrel after extrusion. Prior to belling, the reinforcement band is positioned around the female end of the pipe and when the pipe is enlarged through the belling process, the reinforcement band is embedded into the outer wall of the pipe or at least press fit against the outer wall of the pipe. In addition, a manufacturing process for implementing the reinforcing band into a thermosetting pipe, such as fiber reinforced plastic (FRP) pipe, is also disclosed.

DETAILED DESCRIPTION OF THE INVENTION

Referring to FIGS. 1 through 3A, the preferred embodiment of the present invention is shown with a pipe 10 and a similar adjacent pipe 12. In practice, the pipe 10 has the same structure as the similar adjacent pipe 12 and therefore, a description of structure that is present for the similar adjacent pipe 12 applies equally to a description of the structure for the pipe 10, and vice versa.

Pipe 10 has a female end 14, an intermediate length 16, which may also be referred to as intermediate section 16 having an interior diameter, and a male end 18. The female end 14 has an enlarged exterior diameter 20 with preferably a distinct first cylinder section 22, which may also be referred to as first section 22 with a first enlarged interior diameter, and a distinct second cylinder section 24, which may also be referred to as second section 24 with a second enlarged interior diameter. First cylinder section 22 terminates the female end 14 of the pipe 10 at a female leading edge 26. In the preferred embodiment, second cylinder section 24 is between the first cylinder section 22 and the intermediate length 16, and, transitions directly into the intermediate length 16. In this regard, there is preferably an external shoulder 30 between the second cylinder section 24 and the intermediate length 16. The male end 18 of the pipe 10 is opposite the female end 14 and is also adjacent the intermediate length 16. The male end 18 has external threads 32 disposed thereon and terminates the pipe 10 at a male leading edge 34.

Internal threads 28 are formed on the interior surface of at least a portion of the female end 14 (see FIGS. 1-5A). In the preferred embodiment shown in FIGS. 1-3A, the internal threads 28 are formed within the second cylinder section 24.

The form and number of internal and external threads 28, 32 depend on the application and size of the pipe 10. For example, the preferred embodiment of the present invention for one inch diameter PVC drop pipe has internal and external threads 28, 32 that are tapered, have a triangular thread profile, and conform to ASTM Standard F-1498 for the amount of threads. Preferably, the external threads 32 start at a beveled male leading edge 34 of the male end 18 and the female end 14 has internal threads 28 within the second cylinder section 24 that begin approximately 0.93 inches from the female leading edge 26 and span over slightly more than one inch of pipe length within the second cylinder section 24. One with skill in the art will recognize, however, that characteristics like the thread profile, the length of pipe 10 over which the threads span, whether the threads are tapered, and how far the threads start from their respective leading edges, will vary according to the application and size of the pipe 10.

Regardless of the thread characteristics and the pipe application, a reinforcement band 36 extends circumferentially around at least a portion of the female end 14 of the pipe 10. The reinforcement band 36 is made from a material that has a greater resistance against hoop stress and/or lateral stress than the material from which the pipe 10 is made. As discussed in more detail infra, the material composition of the reinforcement band 36 and the dimensions of the reinforcement band 36 will largely depend on the manufacturing processes of the pipe 10. Preferably, however, the reinforcement band 36 will be made from metal or some sort of metal alloy such as stainless steel.

In its preferred embodiment, the reinforcement band 36 is a single, complete cylinder having a first side 42 facing the internal threads of the second cylinder section 24, a second side 44 facing away from the internal threads of the second cylinder section 24, and an end face 46 at each end between the first side 42 and the second side 44, the cylinder extending around at least a portion of the enlarged exterior diameter 20 of the female end 14. The portion of the female end 14 of the pipe where the reinforcing band 36 is disposed is the portion of the female end 14 between the two designations 46 in FIGS. 3A and 4A that indicate the end faces 46 of the reinforcing band 36. The end faces 46, also referred to as edges, of the reinforcement band 36 are also preferably embedded in the outer wall of the pipe 10 such that the material from which the pipe 10 is made at least partially covers the end faces 46 of the reinforcement band 36. Embedding the reinforcement band 36 in this manner prevents the band 36 from becoming axially displaced from its original position around the pipe. However, in alternative embodiments the reinforcement band 36 may not be embedded in the outer wall of the pipe 10. Instead, the outer wall of the enlarged diameter 20 may be formed to firmly press against the reinforcement band 36 with enough friction to hold the band 36 in place.

Preferably, the reinforcement band 36 is positioned in the outer wall of the female end 14 opposite the internal threads 28 and extending along the length of at least a portion of the internal threads 28. To provide the most protection against failure, at least a portion of the reinforcement band 36 should be placed opposite the last internal thread 29, and preferably extend beyond the last internal thread 29 (see FIG. 3A). Likewise, at least a portion of the reinforcement band 36 may be positioned opposite and extend beyond the first internal thread 31. However, this positioning may not be desirable, depending on the embodiment of the pipe 10. For example, in the preferred embodiment of the pipe 10 the reinforcement band 36 is not positioned opposite the first internal thread 31 because a shoulder 38 is present between the first cylinder section 22 and the second cylinder section 24 (see FIG. 3A). In this regard, the preferred embodiment for the one inch PVC drop pipe mentioned above, has a reinforcement band 36 that is 1.53 inches wide and extends along the second cylinder section 24 from beyond the last internal thread 29 up to the shoulder 38, making the reinforcement band 36 positioned opposite substantially all of the internal threads 28 (see FIG. 3A).

Figure 1:
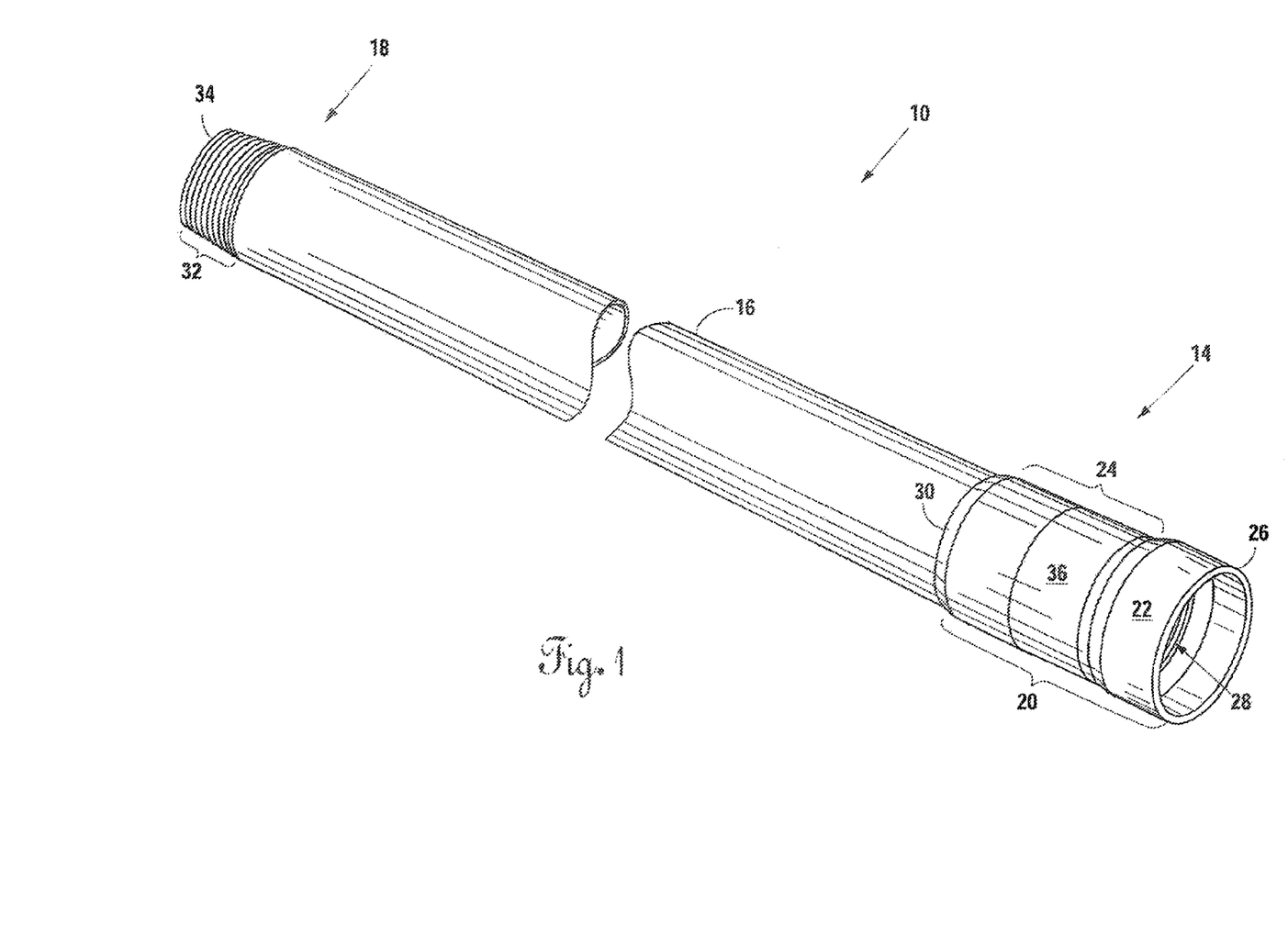
FIG. 1 is a perspective view of the preferred embodiment of the present invention.
Figure 2:
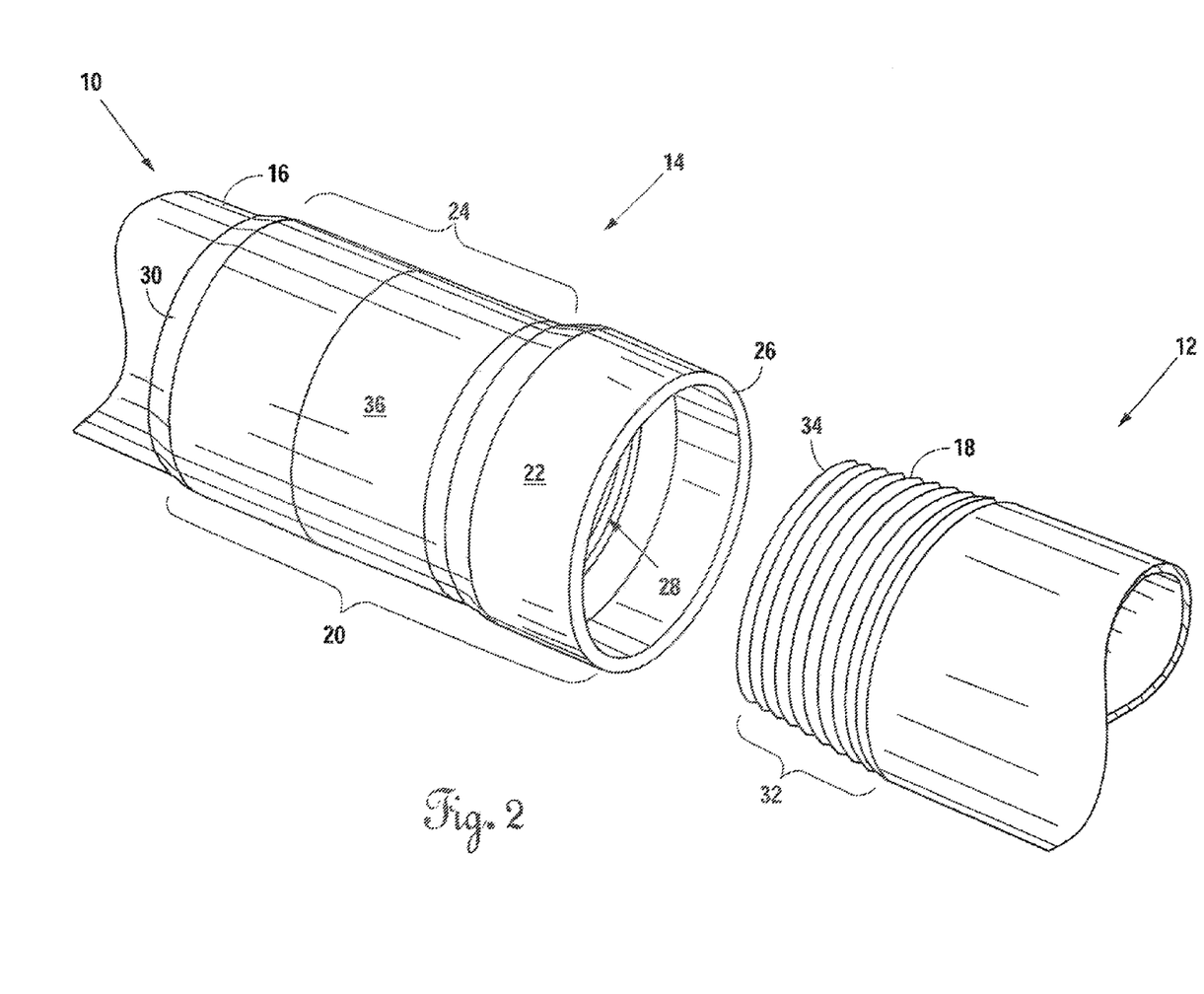
FIG. 2 is an exploded perspective view of the preferred embodiment of the present invention, as shown with the female end of one pipe and the male end of a similar adjacent pipe.
Figure 3:
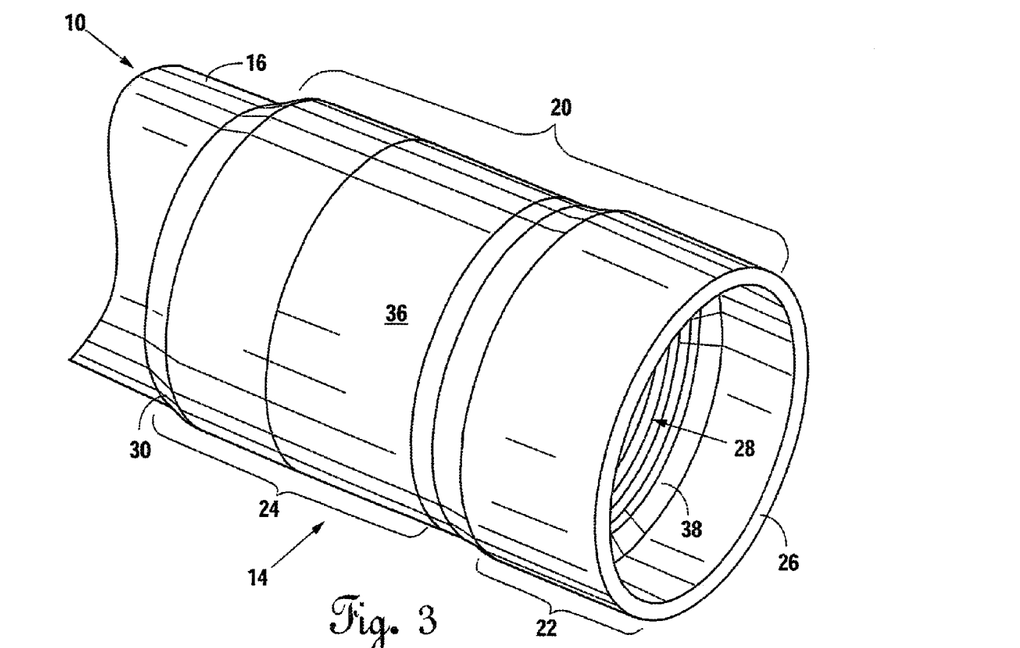
FIG. 3 is a perspective view of the female end of the preferred embodiment of the pipe of the present invention.
Figure 3A:
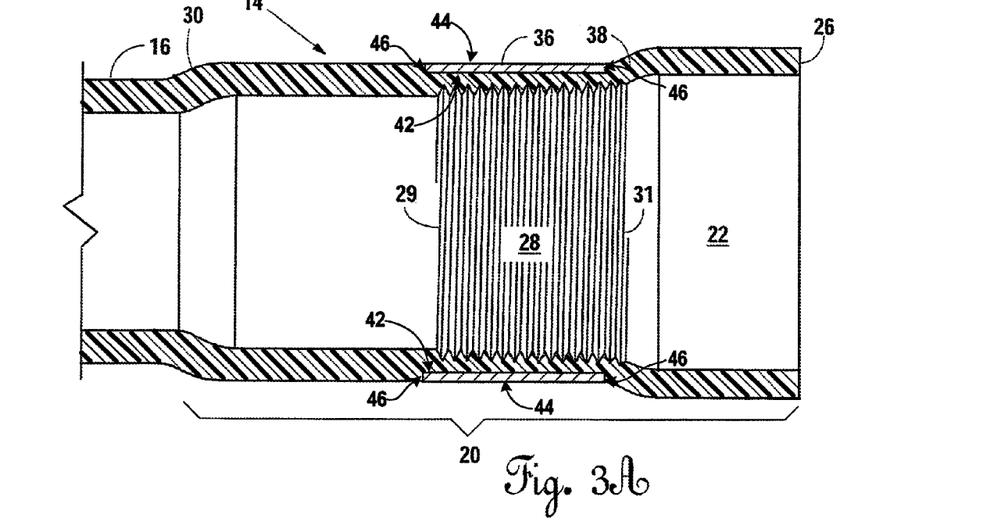
FIG. 3A a cross sectional side view taken along the female end of the preferred embodiment of the pipe of the present invention shown in FIG. 3.
Figure 4:
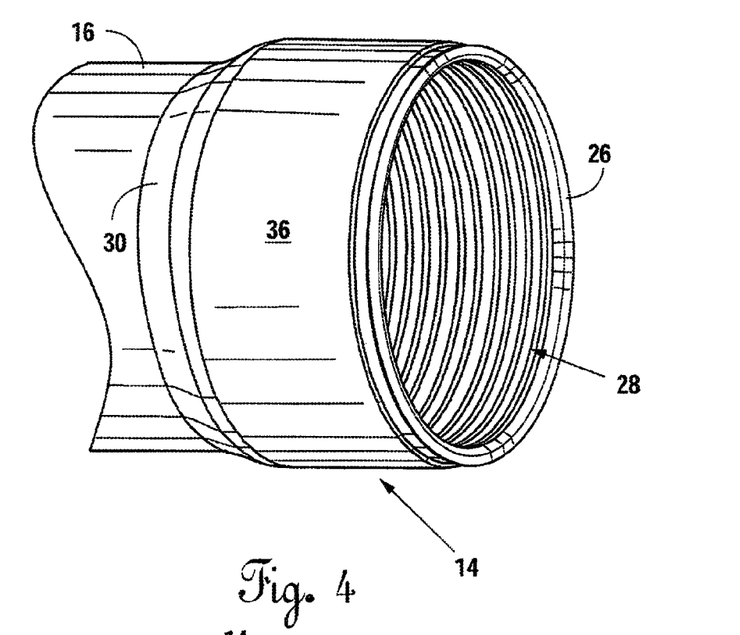
FIG. 4 is a perspective view of the female end of an alternative embodiment of the pipe of the present invention.
Figure 4A:
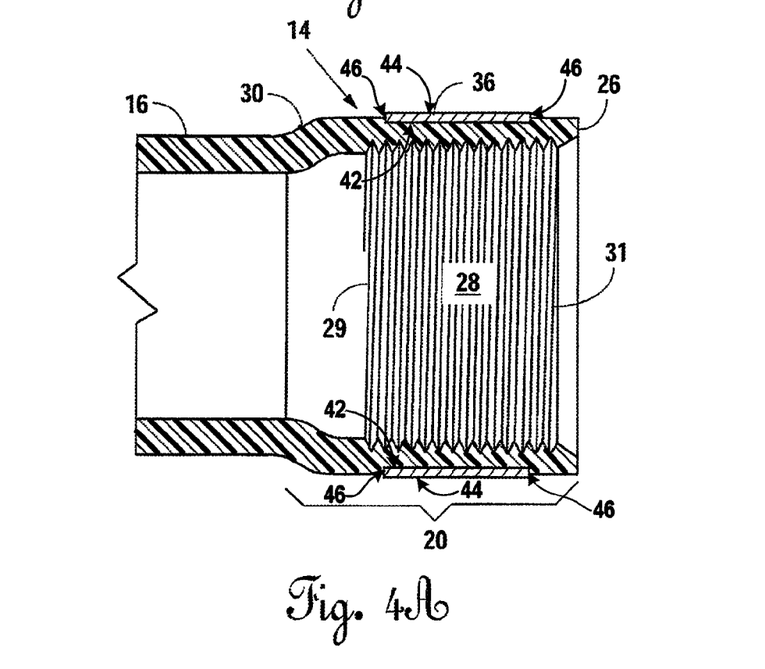
FIG. 4A is a cross sectional view taken along the female end of the alternative embodiment of the present invention shown in FIG. 4.

In alternative embodiments, however, the reinforcement band 36 may be positioned so that it extends beyond the first internal thread 31, or, the reinforcement band 36 may be positioned opposite only a smaller portion of the internal threads 28 such as in the embodiment shown in FIG. 4A. In fact, the reinforcement band 36 may not be positioned opposite the internal threads 28 at all. For example, the reinforcement band 36 may extend around the first cylinder section 22 of the female end 14. In another embodiment, the reinforcement band 36 may extend only partially around the circumference of the female end 14. Furthermore, there may be more than one reinforcement band 36 present. Typically, the form of the reinforcement band 36 and whether more than one reinforcement band 36 is present will depend on factors like the application of the pipe 10 and strength of the material from which the reinforcement band 36 is made, as well as the thickness and width of the reinforcement band 36.

As mentioned, the preferred embodiment of the present invention has a distinct first cylinder section 22 and a distinct second cylinder section 24 at the female end 14 of the pipe 10 (see FIGS. 1-3A). The first cylinder section 22 and the second cylinder section 24 are separated from one another by the shoulder 38 between the two sections. The interior diameter of the first cylinder section 22 is larger than the interior diameter of the second cylinder section 24 with the interior diameter of the second cylinder section 24 being defined as the diameter at the crest of the last internal thread 29

As the male end 18 of the similar adjacent pipe 12 is inserted into the first cylinder section 22 of the preferred embodiment of the pipe 10 it is funneled to the second cylinder section 24. Preferably the male leading edge 34 of the similar adjacent pipe 12 is beveled to aid such funneling. Once at the second cylinder section 24, the external threads 32 of the male end 18 encounter the internal threads 28 of the second cylinder section 24 and turning of the similar adjacent pipe 12 relative to the pipe 10 will cause the threads of the pipes to interlock in a manner well known in the art.

The first cylinder section 22 of the preferred drop pipe embodiment is also preferably elongated so that it receives a substantial portion of the engaging external threads 32 from the similar adjacent pipe 12 before the external threads 32 begin to thread into the internal threads 28 of the pipe 10. The engaging external threads 32 are only those threads which interlock with the internal threads 28 when tightened. The elongated first cylinder section 22 provides additional lateral strength to the threaded connection once the connection is formed and promotes increased watertightness of the connection. In this regard, pipes connected by threaded connections typically leak at the threads when lateral force is applied to the connected pipes and the elongated first cylinder section 22 protects against these lateral forces, as detailed in U.S. Pat. Nos. 6,666,480, 7,261,326, 7,470,383, and 7,425,024.

Furthermore, the interior diameter of the first cylinder section 22 in the preferred PVC drop pipe embodiment of the present invention mentioned above is only slightly larger than the exterior diameter of the male end 18 of the pipe 10 at the crest of the external threads 32 and minimal clearance exists between the male end 18 of the similar adjacent pipe 12 and the female end 14 of the pipe 10 when the male end 18 is inserted into the first cylinder section 22 of the pipe 10.

Other embodiments of the present invention do not have a distinct first cylinder section 22 and a distinct second cylinder section 24. In the alternative embodiment shown in FIGS. 4 & 4a the two different interior diameters are the interior diameter at the bevel and the interior diameter at the crest of the last internal thread 29. This alternative embodiment of the pipe 10 has the reinforcement band 36 positioned opposite from the internal threads 28 of the female end 14 and the reinforcement band 36 extends along the length of only a portion of the internal threads 28. In this regard, the reinforcement band 36 does not extend beyond the last internal thread 29 or the first internal thread 31.

Further alternative embodiments with no distinct first and second cylinder sections 22, 24 and without distinct interior diameters that differ are also contemplated by the present invention. For example, the alternative embodiment shown in FIGS. 4 & 4A could have a non-beveled female leading edge 26 with the internal threads 28 beginning at and extending from the female leading edge 26. In addition, the alternative "flush mount" embodiment of the pipe 10 shown in FIGS. 5 & 5A also do not have distinct first and second cylinder sections 22, 24 and do not have differing interior diameters at the female end 14.

Figure 5:
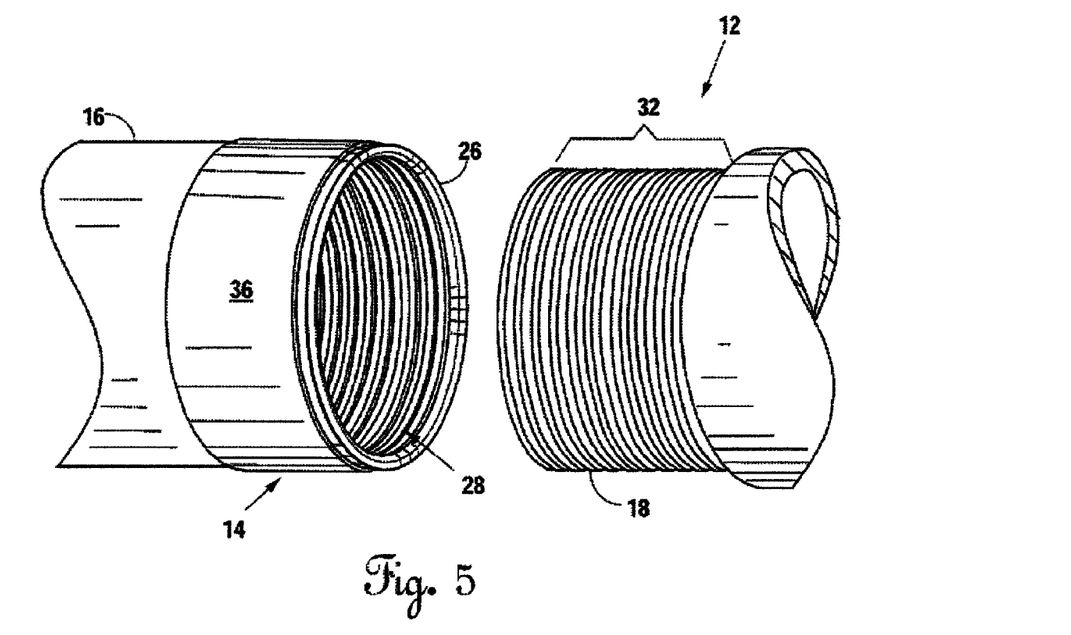
FIG. 5 is a perspective view of the female end of another alternative embodiment of the present invention.
Figure 5A:
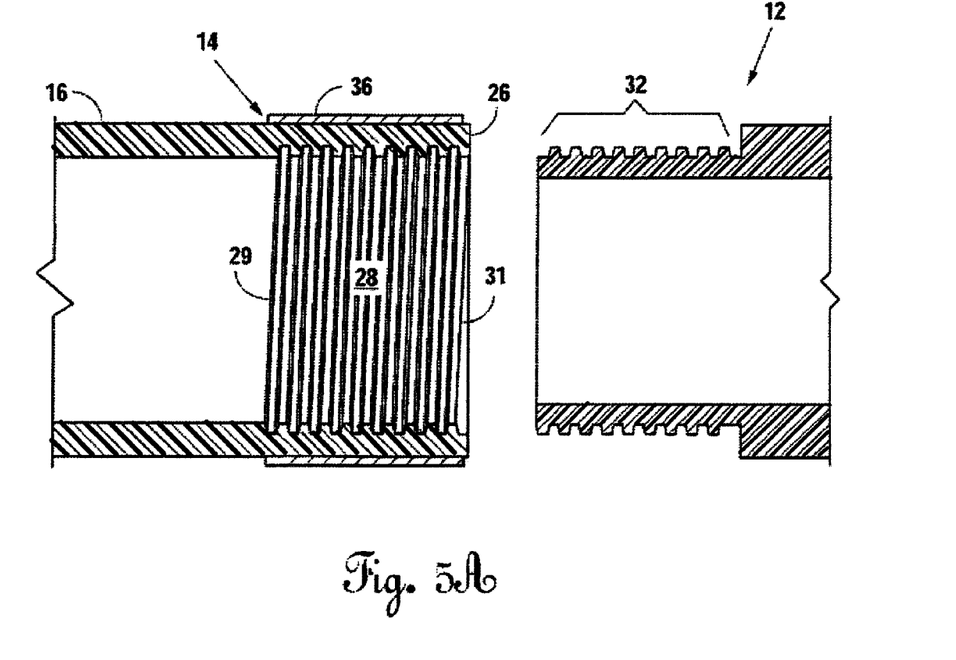
FIG. 5A is a cross sectional view taken along the female end of the alternative embodiment of the present invention shown in FIG. 5.

The alternative flush mount embodiment of the present invention in FIGS. 5 & 5A illustrates the pipe 10 and the similar adjacent pipe 12 without an enlarged exterior diameter 20 at the female end 14 and without an external shoulder 30. As such, the female end 14 is flush with the intermediate length 16. Pipes without an enlarged exterior diameter 20 are well known in the art and when connected, the pipe 10 and the similar adjacent pipe 12 form a so-called "flush mount connection." As shown in FIG. 5A, the pipe 10 in this alternative embodiment does not have tapered internal and external threads 28, 32, but rather, the internal and external threads 28, 32 are non-tapered threads with a trapezoidal thread profile. Depending on the application, however, the internal and external threads 28, 32 could be tapered and have a triangular or other-shaped thread profile.

Additionally, the reinforcement band 36 in the flush mount embodiment shown in FIGS. 5 & 5A is also not embedded in the pipe wall of the pipe 10. Instead, the reinforcement band 36 is shrink fit on the outer wall of the female end 14 so that it tightly presses against the outer wall of the female end 14 of the pipe 10, as explained infra.

Figure 6:
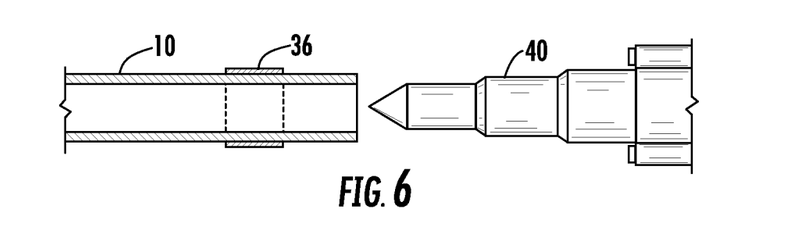
FIG. 6 is a cross sectional view of the pipe and a perspective view of a mandrel prior to insertion of the mandrel into the pipe, during the preferred manufacturing process for the preferred embodiment of the present invention.
Figure 6A:
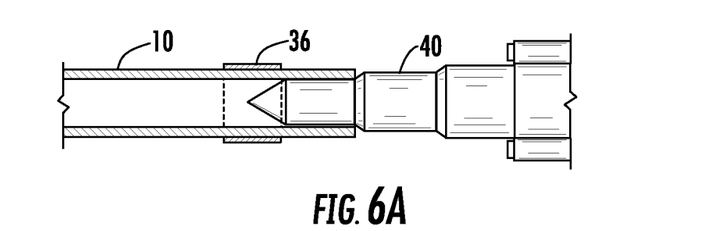
FIG. 6A is a cross sectional view of the pipe and a perspective view of a mandrel after the mandrel has been initially inserted in the pipe, during the preferred manufacturing process for the preferred embodiment of the present invention.
Figure 6B:
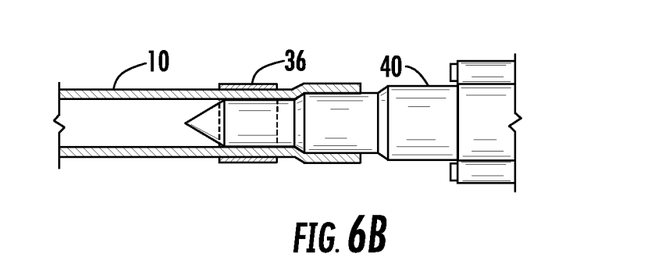
FIG. 6B is a cross sectional view of the pipe and a perspective view of a mandrel after the mandrel has been further inserted into the pipe, during the preferred manufacturing process for the preferred embodiment of the present invention.
Figure 6C:
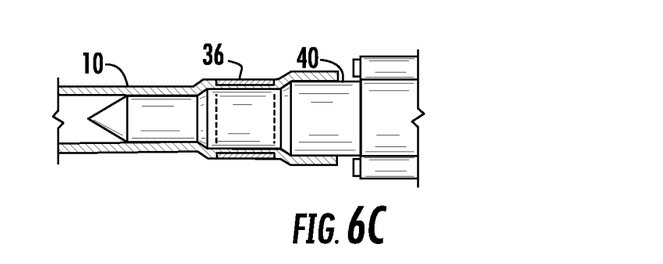
FIG. 6C is a cross sectional view of the pipe and a perspective view of a mandrel after the mandrel has been fully inserted into the pipe, during preferred manufacturing process for the preferred embodiment of the present invention.

Turning to the manufacturing processes for the present invention, FIGS. 6-6C illustrate the preferred manufacturing method for the preferred embodiment for the pipe 10 when the pipe 10 is extruded and belled after such extrusion. As shown, a mandrel 40 is inserted into the pipe 10 after the pipe 10 has been extruded and cut into its desired length.

Extruding the pipe and cutting it to the desired length are manufacturing processes that are well known in the art. After extrusion and cutting, the pipe 10 is typically moved to another location in the manufacturing assembly and one end of the pipe 10 is sufficiently heated to render it pliable. Once pliable, the pipe 10 is clamped into place and the mandrel 40 is forced into the heated end of the pipe 10 by a hydraulic cylinder (not shown) to form the contour of the female end 14 of the pipe 10. The mandrel 40 is made of metal and when pressed against the inner circumference of the pliable end of the pipe 10, the mandrel 40 will force the pliable end outward, thereby increasing both the inner and outer circumference of the pipe 10 where the mandrel 40 is inserted. The increase in both inner and outer circumference of the female end 14 creates the enlarged exterior diameter 20 and the external shoulder 30.

The reinforcement band 36 is sized so that when the mandrel 40 is inserted into the pliable end of the pipe 10, the outer wall of the pipe 10 comes into contact with—and preferably deforms around—the edges of the reinforcement band 36. The reinforcement band 36 is positioned over the pliable end of the pipe 10 prior to insertion of the mandrel 38. Unlike the heated end of the pipe 10, the reinforcement band 36 is not pliable and as the outer wall of the pipe 10 contacts the reinforcement band 36 the outer wall deforms around the edges of the reinforcement band 36 thereby embedding the reinforcement band 36.

The degree or amount of embedding of the reinforcement band 36 into the pliable end of the pipe 10 in the preferred embodiment will depend on the following factors: (1) the size of the reinforcement band 36 relative to the pipe 10 prior insertion of the mandrel 40; (2) the thickness of the reinforcement band 36; (3) the thickness of the outer wall of the pipe 10; and (4) the size of the circumference of the mandrel 40 relative to the pipe 10 prior to insertion of the mandrel 40. With regard to the last factor, the size of the circumference of the mandrel 40 will dictate the amount by which the circumference of the pliable end of the pipe 10 is enlarged. With a one inch extruded PVC drop pipe, for example, the reinforcement band 36 is stainless steel, has an outer diameter of 1.522 inches, and is, at a minimum, 0.020 inches thick.

It should be noted that the mandrel 40 shown in FIGS. 6-6C is designed to form the preferred embodiment of the present invention. As a result, the reinforcement band 36 is positioned over the pliable end of the pipe 10 at a distance that is far enough from the female leading edge 26 so the reinforcement band 36 will embed into the outer wall of the pipe 10 at the second cylinder section 24, opposite where the internal threads 28 will be formed—a step that occurs later in the manufacturing process. As mentioned above, the reinforcement band 36 could be positioned over the pliable end of the pipe 10 so that it embeds in other positions on the outer wall of the pipe 10. It should further be noted that the reinforcement band 36 could be positioned over the end of the pipe 10 prior to heating the end of the pipe 10.

Figure 7:
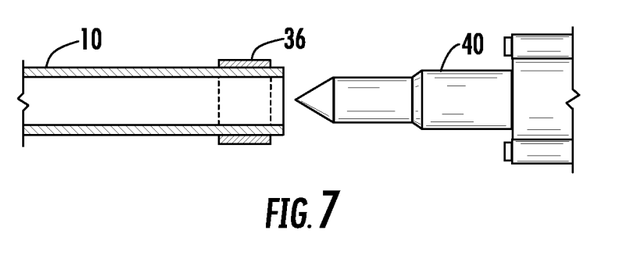
FIG. 7 is a cross sectional view of the pipe and a perspective view of a mandrel prior to insertion of the pipe onto the mandrel, during an alternative manufacturing process for an alternative embodiment of the present invention.
Figure 7A:
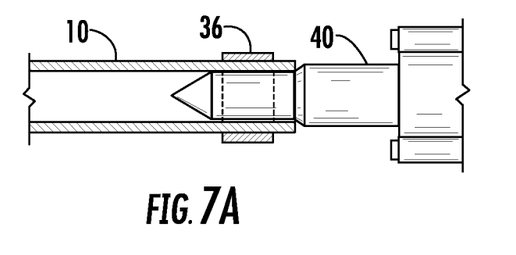
FIG. 7A is a cross sectional view of the pipe and a perspective view of a mandrel after the pipe has been partially inserted over the mandrel, during an alternative manufacturing process for an alternative embodiment of the present invention.
Figure 7B:
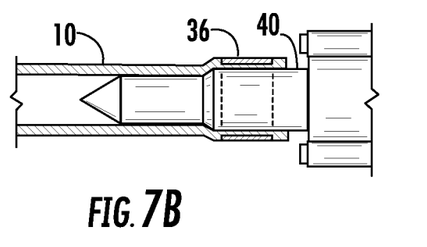
FIG. 7B is a cross sectional view of the pipe and a perspective view of a mandrel after the pipe has been fully inserted onto the mandrel, during an alternative manufacturing process for an alternative embodiment of the pipe present invention.

FIGS. 7-7B show an alternative manufacturing process of the present invention, which in this case, is directed to manufacturing the alternative embodiment of the invention shown in FIGS. 4-4A. In this alternative manufacturing process, the mandrel 40 stays static and the pliable end of the pipe 10 is urged over the mandrel 40. Again, the reinforcement band 36 is positioned over the pliable end of the pipe 10 and is sized to have the outer wall of the pipe 10 contact it during the enlarging process, but in this instance, the reinforcement band 36 moves at the same rate with the pliable end of the pipe 10 as the pipe 10 is urged onto the mandrel 40.

Once the mandrel 40 is inserted into the one of the pipe 10, or the one end of the pipe 10 is urged onto the mandrel 40, a cooling agent such as water is applied to the now-enlarged end of the pipe 10. The cooling agent cools the pipe 10 and conforms the enlarged end of the pipe 10 to the shape of the mandrel 40. From this point, the mandrel 40 is removed from the pipe 10, or vice versa, and the pipe 10 has acquired the contour of the mandrel 40 and the reinforcement band 36 is positioned thereon.

Once the mandrel 40 is removed from the pipe 10, the internal threads 28 and external threads 32 are formed. In the preferred embodiment, the internal threads 28 are machined into at least a portion of the interior surface of the second cylinder section 24, or alternatively, throughout the entire interior surface of the second cylinder section 24, using processes that are well known in the art. Similar processes form the external threads 32 on the male end 18.

When the female end 14 of the pipe 10 does not have an enlarged exterior diameter 20 like the alternative embodiment shown in FIGS. 5 & 5A, the process to install the reinforcement band 36 on the female end 14 may be altered. On way to manufacture this embodiment of the present is to shrink fit the reinforcement band 36 on the female end 14. Shrink-fitting is a well-known manufacturing process. The reinforcement band 26 is initially sized such that its interior dimensions are almost identical to the dimensions of the outer wall of the pipe 10 at the female end 14. The reinforcement band 36 is also made from a material that has a coefficient of thermal expansion which allows the reinforcement band 36 to expand when heated and contract back to its original shape when cooled. In this regard, the reinforcement band 36 is preferably made from a material that has a high coefficient of thermal expansion, such as aluminum or brass. The reinforcement band 36 is heated and expands, and then, is positioned around the female end 14 of the pipe 10. After it is moved to its desired position, the reinforcement band 36 is cooled and contracts back to its original shape, causing it to press against the outer wall of the pipe 10.

It should be finally noted that the pipe 10 of the present invention is not limited to extruded pipe 10. The apparatus of the present invention can be implemented into thermosetting pipe and pipes made from other composite materials. In this regard, adding a step for installation of the reinforcement band 36 can be implemented into manufacturing processes that are well known for these other types of pipe. For example, and not by way of limitation, positioning the reinforcement band 36 over the mandrel 40 during the filament winding processes for FRP pipe is within the scope of the apparatus contemplated by the present invention.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

I claim:

1. A single piece of pipe connectable to an adjacent pipe, said single piece of pipe comprising a first material, said single piece of pipe comprising:
   a male end having external threads;
   a female end having an enlarged exterior diameter;
   an intermediate section between said male end and said female end having an interior diameter and an exterior diameter;
   a first section at said female end having an interior diameter to receive a male end of said adjacent pipe therethrough and an exterior diameter larger than the exterior diameter of said intermediate section;
   a second section at said female end having internal threads to mate with external threads of a male end of said adjacent pipe, said second section having an exterior diameter smaller than the exterior diameter of said first section and larger than the exterior diameter of said intermediate section;

a first shoulder with a first end at said first section and a second end at said second section, wherein said female end is belled to create said first shoulder and said first section;

a second shoulder with a first end at said second section and a second end at said intermediate section, wherein said female end is belled to create said second shoulder and said second section;

said first section positioned to funnel said male end of said adjacent pipe to said second section;

said second section being positioned between said intermediate section and said first section, wherein said first section, said second section and said intermediate section are distinct;

at least one circular reinforcement band of a second material positioned circumferentially around at least a portion of said second section and said internal threads, said at least one reinforcement band including a first side facing said internal threads of said second section, an opposite second side facing away from said internal threads of said second section, and end faces located where said first side and said second side terminate; and said pipe being disconnectable from said adjacent pipe and reusable, wherein the at least one reinforcement band has an inside diameter that is no greater than the enlarged exterior diameter of the portion of the female end around which the reinforcement band is positioned, wherein said second side of said reinforcement band is substantially free of contact with said female end, wherein the end faces of said reinforcement band are at least partially embedded in the outer wall of said pipe at said female end, and wherein said internal threads include a last internal thread that is closest to said intermediate section, and wherein said reinforcement band extends from the first shoulder and beyond the last internal thread of said internal threads and wherein said second material has greater resistance against hoop stress and lateral stress than said first material.

2. The pipe as recited in claim 1 wherein said interior diameter of said first section is slightly larger than the outer diameter of the male end of said adjacent pipe.

3. The pipe as recited in claim 1 wherein said internal threads of said second section of said pipe are configured to mate with external threads of a male end of said adjacent pipe, wherein said internal threads and said external threads are tapered, and wherein said first section is elongated and is configured to receive a substantial portion of the external threads of the male end of said adjacent pipe before the external threads begin to mate with said internal threads to create a watertight connection when said threads are mated.

4. The pipe as recited in claim 3 wherein the external threads and the internal threads have a triangular thread profile.

5. The pipe as recited in claim 1 wherein said pipe is an extruded thermoplastic pipe.

6. The pipe as recited in claim 5 wherein said pipe is a polyvinyl chloride (PVC) drop pipe.

7. The pipe as recited in claim 1 wherein said pipe is manufactured from a thermosetting plastic.

8. The pipe as recited in claim 7 wherein said pipe is a fiber reinforced plastic (FRP) pipe.

9. The pipe as recited in claim 1 wherein said reinforcement band extends partially around at least a portion of said female end.

10. The pipe as recited in claim 1 wherein said reinforcement band is positioned opposite from and extends along the length of substantially all of said internal threads of said second section.

11. The pipe as recited in claim 1 wherein said internal threads include a first internal thread that is closest to said first section, wherein said reinforcement band extends beyond the first internal thread of said internal threads.

12. The pipe as recited in claim 1 wherein the end faces of said reinforcement band are totally embedded in the outer wall of said pipe at said female end.

13. The pipe as recited in claim 1 wherein said second material is metal.

14. The pipe as recited in claim 1 wherein the first shoulder and the second shoulder are external shoulders.

15. A single piece of pipe connectable to an adjacent pipe, said single piece of pipe comprising a first material, said single piece of pipe comprising:

a male end having external threads terminating said male end;

a female end having an enlarged exterior diameter;

an intermediate section between said male end and said female end having an interior diameter and an exterior diameter;

a first enlarged interior diameter of said pipe at said female end, said first enlarged interior diameter having internal threads to mate with external threads of a male end of said adjacent pipe, and corresponding to the first enlarged interior diameter a first enlarged exterior diameter larger than the exterior diameter of said intermediate section;

a second enlarged interior diameter being larger than said first enlarged interior diameter and terminating said pipe at said female end, said second enlarged interior diameter being slightly larger in diameter than said male end of said adjacent pipe to receive said male end therethrough, and corresponding to the second enlarged interior diameter a second enlarged exterior diameter larger than said first enlarged exterior diameter;

a first shoulder with a first end at said first enlarged exterior diameter and a second end at said second enlarged exterior diameter, wherein said female end is belled to create said first shoulder and said second enlarged exterior diameter;

a second shoulder with a first end at said intermediate section and a second end at said first enlarged exterior diameter, wherein said female end is belled to create said second shoulder and said first enlarged exterior diameter;

at least one circular reinforcement band of a second material positioned circumferentially around at least a portion of said first enlarged exterior diameter and said internal threads, said at least one reinforcement band including a first side facing said internal threads of said female end, an opposite second side facing away from said internal threads of said female end, and end faces located where said first side and said second side terminate; and said pipe being disconnectable from said adjacent pipe and reusable, wherein said first enlarged exterior diameter is positioned between said intermediate section and said second enlarged exterior diameter, wherein said first enlarged exterior diameter, said second enlarged exterior diameter and said intermediate section are distinct, wherein the at least one reinforcement band has an inside diameter that is no greater than the enlarged exterior diameter of the portion of the female end around which the reinforcement band is positioned, wherein said second side of said reinforcement band is substantially free of contact with said female end, wherein the end faces of said reinforcement band are at least partially embedded in the outer wall of said pipe at said female end, wherein said reinforcement band of said second material is positioned opposite from and extends along the length of at least a portion of said internal threads of said first enlarged interior diameter of said pipe of said first material, and wherein said internal threads include a last internal thread that is closest to said intermediate section, and wherein said reinforcement band extends from the first shoulder and beyond the last internal thread of said internal threads and wherein said second material has greater resistance against hoop stress and lateral stress than said first material.

16. The pipe as recited in claim 15 wherein said external threads and said internal threads are tapered and wherein said internal threads of said first enlarged interior diameter of said pipe are configured to interlock with external threads of a male end of said adjacent pipe, wherein said second enlarged interior diameter is elongated and is configured to receive a substantial portion of the mating external threads of the male end of said adjacent pipe before the external threads begin to mate with said internal threads to form a connection that is watertight.

17. The pipe as recited in claim 15 wherein said pipe is an extruded thermoplastic pipe.

18. The pipe as recited in claim 15 wherein said reinforcement band is positioned opposite from and extends along the length of substantially all of said internal threads of said first enlarged interior diameter.

19. The pipe as recited in claim 15 wherein said internal threads include a first internal thread that is farthest from said intermediate section, and wherein said reinforcement band extends beyond the first internal thread of said internal threads.

20. The pipe as recited in claim 15 wherein the end faces of said reinforcement band are totally embedded in the outer wall of said pipe at said female end.

21. The pipe as recited in claim 15 wherein said reinforcement band extends partially around at least a portion of said female end.

22. The pipe as recited in claim 15 wherein the first shoulder and the second shoulder are external shoulders.

23. A single piece of pipe connectable to an adjacent pipe, said single piece of pipe comprising a first material, said single piece of pipe comprising:

a male end having external threads;

a female end having where the pipe terminates a first enlarged interior diameter with a corresponding first enlarged exterior diameter, and an adjacent second enlarged interior diameter with a corresponding second enlarged exterior diameter, the first enlarged interior diameter larger than the second enlarged interior diameter, the first enlarged exterior diameter larger than the second enlarged exterior diameter, said female end having internal threads to mate with external threads of a male end of said adjacent pipe;

an intermediate section between said male end and said female end having an interior diameter smaller than the second enlarged interior diameter and an exterior diameter smaller than the second enlarged exterior diameter;

a first shoulder with a first end at said first enlarged exterior diameter and a second end at said second enlarged exterior diameter, wherein said female end is belled to create said first shoulder and said first enlarged exterior diameter;

a second shoulder with a first end at said second enlarged exterior diameter and a second end at said intermediate section, wherein said female end is belled to create said second shoulder and said second enlarged exterior diameter; and at least one circular reinforcement band of a second material positioned circumferentially around at least a portion of said second enlarged exterior diameter and said internal threads, said at least one reinforcement band including a first side facing said internal threads of said female end, an opposite second side facing away from said internal threads of said female end, and end faces located where said first side and said second side terminate, wherein said second enlarged exterior diameter is positioned between said intermediate section and said first enlarged exterior diameter, wherein said first enlarged exterior diameter, said second enlarged exterior diameter and said intermediate section are distinct;

wherein the at least one reinforcement band has an inside diameter that is no greater than the enlarged exterior diameter of the portion of the female end around which the reinforcement band is positioned, wherein said second side of said reinforcement band is substantially free of contact with said female end, wherein said reinforcement band of said second material is positioned opposite from and extends along the length of at least a portion of said internal threads of said female end of said pipe of said first material, and wherein said internal threads include a last internal thread that is closest to said intermediate section, and wherein said reinforcement hand extends from the first shoulder and beyond the last internal thread of said internal threads and wherein said second material has greater resistance against hoop stress and lateral stress than said first material.

24. The pipe as recited in claim 23 wherein said pipe is disconnectable from said adjacent pipe and reusable, wherein said internal threads and said external threads are tapered, and wherein said first enlarged exterior diameter is elongated and is configured to receive a substantial portion of the mating external threads of the male end of said adjacent pipe before the external threads begin to mate with said internal threads to create a water tight connection when the threads mate.

25. The pipe as recited in claim 23 wherein said enlarged interior and exterior diameter are formed by expanding said female end when heated and pliable.

26. The pipe as recited in claim 23 wherein said reinforcement band is positioned opposite from and extends along the length of substantially all of said internal threads of said female end.

27. The pipe as recited in claim 23 wherein said internal threads include a first internal thread that is farthest from said intermediate section, and wherein said reinforcement band extends beyond the first internal thread of said internal threads.

28. The pipe as recited in claim 23 wherein the end faces of said reinforcement band are totally embedded in the outer wall of said pipe at said female end.

29. The pipe as recited in claim 23 wherein said reinforcement band is metal.

30. The pipe as recited in claim 23 wherein said reinforcement band extends partially around at least a portion of said female end.

31. The pipe as recited in claim 23, wherein the end faces of said reinforcement band are at least partially embedded in the outer wall of said pipe at said female end.

32. The pipe as recited in claim 23 wherein the first shoulder and the second shoulder are external shoulders.

\* \* \* \* \*